US008141603B2

(12) United States Patent
Conry et al.

(10) Patent No.: US 8,141,603 B2
(45) Date of Patent: Mar. 27, 2012

(54) VARIABLE GUIDE FOR A GANG SAW

(76) Inventors: Patrick M Conry, Hot Springs, AR (US); Russell Kennedy, Hot Springs, AR (US); Chris Raybon, Hot Springs, AR (US); Russell Roberson, Russellville, AR (US)

( * ) Notice: Subject to any disclaimer, the term of this patent is extended or adjusted under 35 U.S.C. 154(b) by 580 days.

(21) Appl. No.: 12/068,268

(22) Filed: Feb. 5, 2008

(65) Prior Publication Data

US 2009/0194199 A1 Aug. 6, 2009

(51) Int. Cl.
*B23Q 15/00* (2006.01)
*B23Q 16/00* (2006.01)

(52) U.S. Cl. ........... 144/357; 144/3.1; 144/39; 144/403; 83/365

(58) Field of Classification Search .................. 144/335, 144/356, 357, 245.1, 378, 392, 2.1, 3.1, 39, 144/41, 376, 377, 382, 245.2, 242.1, 250.17, 144/403, 407; 83/368, 369, 370, 371, 425.2, 83/425.3, 425.4, 365, 367
See application file for complete search history.

(56) References Cited

U.S. PATENT DOCUMENTS 3,985,055 A * 10/1976 Cornell ........................... 83/367
4,333,373 A * 6/1982 Blickenderfer ................. 83/419
4,340,137 A * 7/1982 Foster ...................... 198/457.03
4,441,537 A * 4/1984 Vartiainen ...................... 144/357
4,468,992 A * 9/1984 McGeehee ........................ 83/56
4,633,924 A * 1/1987 Hasenwinkle et al. .... 144/250.2
4,653,560 A * 3/1987 Wislocker et al. ......... 144/250.2
4,926,917 A * 5/1990 Kirbach ........................ 144/356
4,977,805 A * 12/1990 Corley, III ..................... 83/76.8
5,429,161 A * 7/1995 Allard ........................ 144/248.4
5,722,474 A 3/1998 Raybon
5,816,302 A * 10/1998 Newnes ........................ 144/357
5,853,038 A * 12/1998 Newnes ........................ 144/357
6,178,858 B1 * 1/2001 Knerr et al. .................... 83/76.8
6,382,067 B1 * 5/2002 Gagnon .......................... 83/732
6,860,302 B2 * 3/2005 Brisson ......................... 144/382
7,017,632 B2 * 3/2006 Kennedy et al. .............. 144/357
7,108,030 B1 * 9/2006 Smith ........................... 144/357
7,308,921 B1 * 12/2007 Brewer, Sr. .................... 144/3.1
7,536,939 B2 * 5/2009 Bureau .......................... 83/75.5
2002/0152861 A1 * 10/2002 Conry ............................... 83/56
2003/0019545 A1 * 1/2003 Woodford et al. ............ 144/357

* cited by examiner

*Primary Examiner* — Gregory Huson
*Assistant Examiner* — Jennifer C Chiang
(74) *Attorney, Agent, or Firm* — Jeffrey S. Melcher; Manelli Selter PLLC

(57) ABSTRACT

A guide arm for a gang sawmill is provided adjacent to an inlet of a gang saw and is movable about a pivot pin depending on the actual curvature of a cant to adjust (continuously or fixed) the position of an incoming cant to maximize the yield of usable boards produced by the gang saw by moving the cant relative to the saw as a conveyor feeds the cant through the gang saw.

14 Claims, 5 Drawing Sheets

VARIABLE GUIDE FOR A GANG SAW

This invention relates to a device for improving the recovery of curved logs or cants by getting more marketable lumber from them.

BACKGROUND OF THE INVENTION

In preparing lumber for the construction market, it has been the object to provide boards of substantially uniform thickness along the length of each board. In the past, it has been the practice to sell unevenly cut boards at below high quality boards due to the variations in the sawn boards, However, with the increasing price of raw logs and the decreasing value of finished lumber, attempts have been made to improve the sawing apparatus to enable improved handling of curved cants to increase the amount of merchandisable lumber obtained. Further, the devices installed in mills to saw curved cants have generally been complicated in structure and expensive to maintain to allow accurate sawing of curved cants.

DESCRIPTION OF THE PRIOR ART

A number of employed devices, such as that shown in U.S. Pat. No. 5,722,474, commonly referred to as the "Wiggle Box Gang", use a pivoting gang saw arrangement where the arbor on which the saws are mounted is pivotable about a vertical axis as the cant is fed to the gang. While such systems have generally been effective in salvaging curved cants, that is, the mill operator was able to produce more usable boards than straight sawing technologies, initial cost and installation of such systems has been expensive and the maintenance has been relatively high. Where a pivoting gang apparatus such as this is utilized, there is a significant gap in the flow of cants through the system to allow the pivoting mechanism to set properly for the on-coming piece. This, coupled with a maximum speed limitation imposed by the saw's ability to saw properly, limited the volume of material processed to sometime necessitate multiple lines to reach the production goals desired.

Another employed device is often referred to as a "Curved Canting" system. In a conventional curved canting operation, a chipping station precedes the gang saw station where chipping heads are physically separated from the gang saw chamber. In such an operation, the chipping heads are moved and controlled in a manner to follow the path of curvature of a cant to chip two parallel faces on the sides of the cant. The cant is then fed to the gang saw. The conventional curved canting system provides a fixed control guide arm mounted on the conveyor apparatus immediately upstream of the bank of saws in the gang so that the saws themselves need not be pivotally mounted but only rotatably mounted on a conventional driven arbor. The cutting of a curved cant often, however, results in what is called a snipe end board, that is, one the thickness of which varies from one dimension to a smaller dimension in thickness. Such produced boards frequently require cutting off the non-uniform end piece which is then discarded thereby reducing the yield.

Thus, there is a need for a more controllable system and device to handle curved cants that will not require major modification of an already installed fixed apparatus and one which can be easily maintained by mill employees.

SUMMARY OF THE INVENTION

The present invention of the variable guide system provides a control guide arm mounted on the conveyor apparatus immediately upstream of the bank of saws in the gang so that the saws themselves need not be pivotally mounted but only rotatably mounted on a conventional driven arbor. An inspection station is provided upstream of the guide arm and upstream of the chipping station and will provide output to the guide arm in a timed manner so that the guide arm will be pivoted about a mounting axis to engage the cant in cooperation with a press arm as the front end of the cant is entering the gang saw. The inspection station is provided with a plurality of light sources, such as lasers and light detectors and may be one of those that are commercially available. The actuation device for the guide arm may be one of a number of types including an electrically actuated solenoid, a fluid piston and cylinder.

The advantages of the present invention are believed to be apparent from the following description taken in conjunction with the accompanying drawings, in which:

DETAILED DESCRIPTION

Figure 1A:
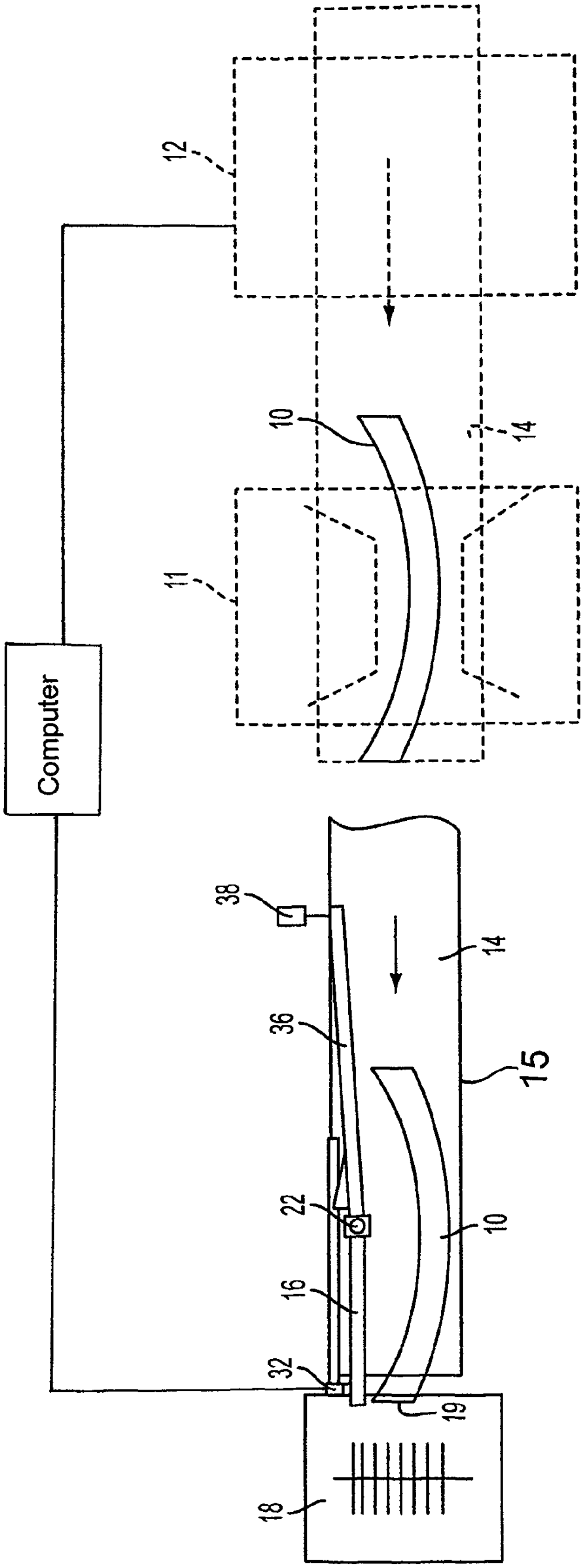
FIG. 1A is a schematic view from the top of a gang saw apparatus and associated conveyors showing the location of the guide arm of the present invention upstream of the gang saw with the cant, guide and push bars positioning the end of a cant just prior to engaging the gang saw.
Figure 1B:
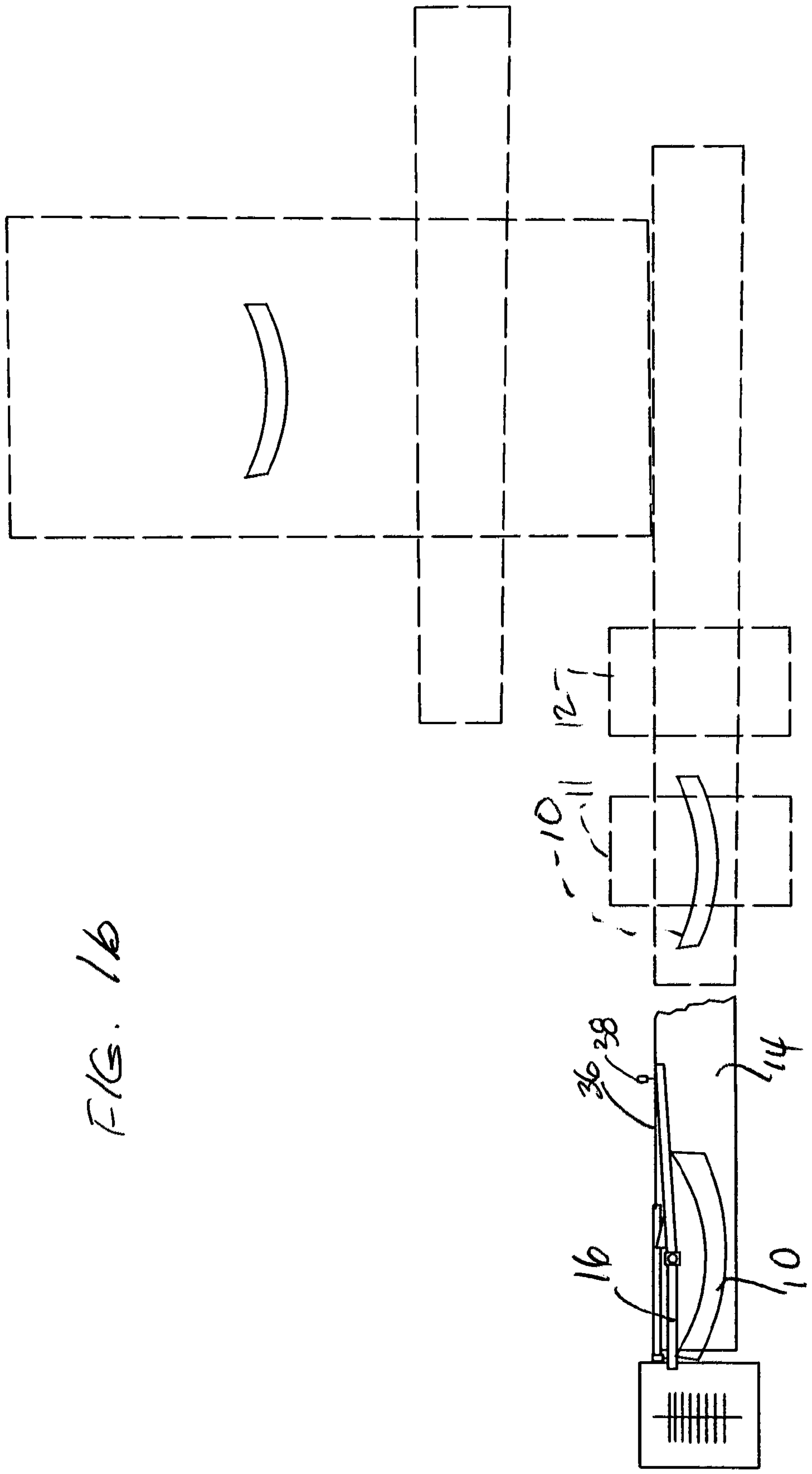
FIG. 1B is an alternative schematic view showing a transverse inspection station.
Figure 1C:
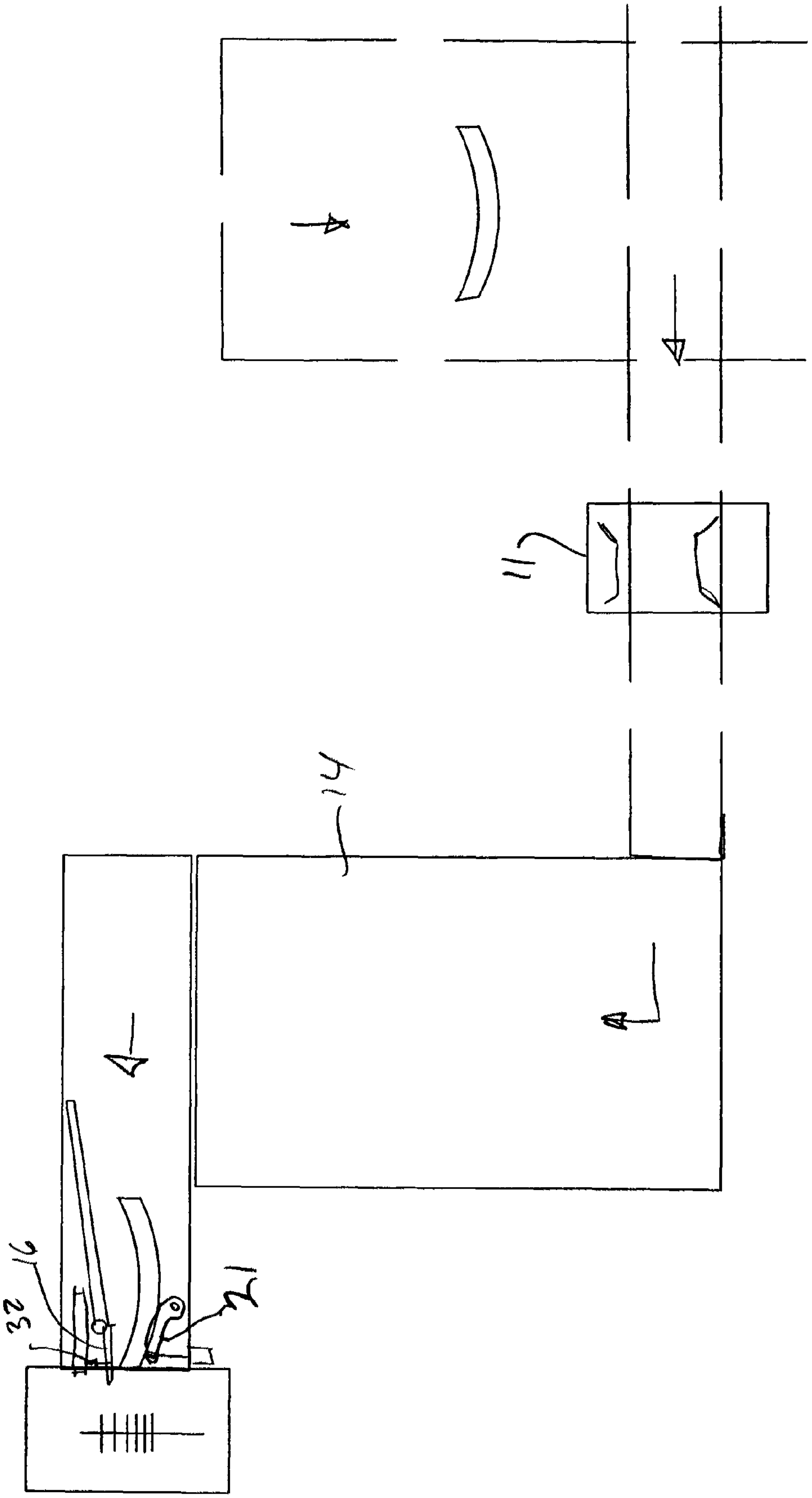
FIG. 1C is an alternative schematic view showing a transverse inspection and an out-of-line sawing section.

Referring to the drawings, there is shown in FIG. 1 a schematic illustration of an apparatus for cutting a cant 10 into boards by passing the cant between a gang saw set. In a typical arrangement, a cant 10 will be fed on a conveyor 14 after having been chipped on both sides at a pivoting chipping station 11 which will follow an inspection station 12. At the inspection station 12, the curvature, if any, of the cant is determined by a series of photo detectors, lasers, cameras and light sources mounted above, below and alongside the conveyor path 14 and preferably on either side of the cant 10. In the event that no curvature of any significance is detected at the inspection station 12, a guide arm 16 will be set to its home "zero" position and a press arm 21 (FIG. 1C) will be operated, such as by a piston and cylinder 32 (FIG. 1A) that is activated when a sensor detects the presence of a cant 10, to push the leading end 19 of the cant 10 against the guide arm 16. However, any curvature detected at the inspection station 12 will be analyzed by a computer at the inspection station 12 which will calculate any required pivoting of the chipping station 11 as cant 10 travels along the path 14 in order to maximize the amount of useful board lumber that will be obtained as the cant is fed through the gang saw 18. For this purpose, the output of the inspection station will be communicated to an actuator 32 as described below. As noted above, the press arm 21 is operated upon detection of cant 10 and simply presses the cant 10 against the facing surface of the guide arm 16 while the guide arm 16 will be pivoted about axis 22 to adjust the position of the end 19 relative to the gang saw 18 in order to position the cant to minimize the effect of the curvature at the point of contact with the gang saw 18. An auxiliary guide arm 36 may be positioned to pivot about axis 22 by a piston and cylinder 38 (FIG. 1B) independently of guide arm 16.

Figure 2:
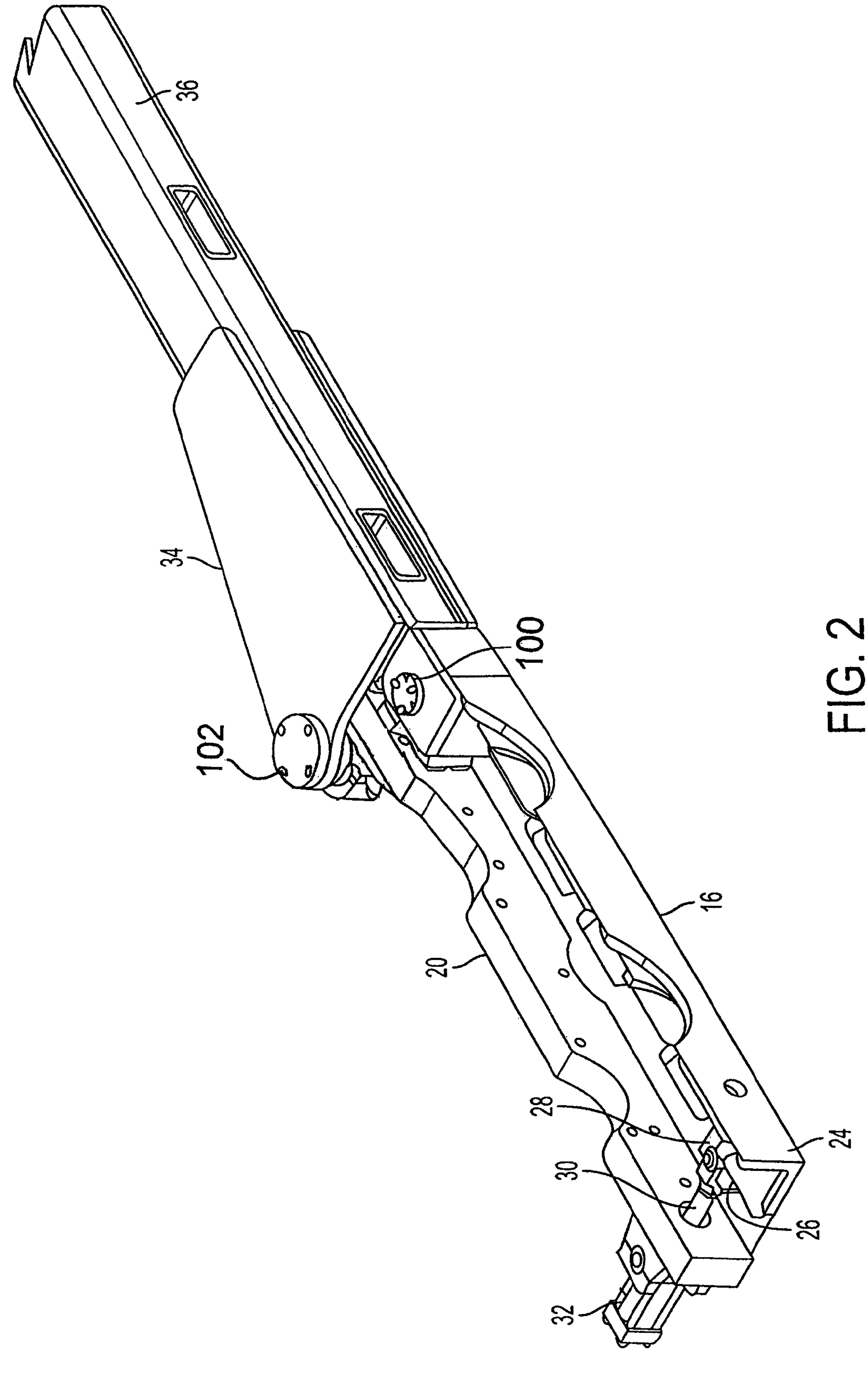
FIG. 2 is a perspective view of the mounting and the variable guide actuation mechanism used in the present invention.

Referring to FIG. 2, there is shown a perspective view of the guide arm 16 mounted adjacent to a fixed side bar 20 of the conveyor apparatus typically used in a saw mill. The guide arm 16 is connected to the actuating cylinder 32. The opposite end 24 of the guide arm 16 has an inner edge 26 from which a leaf or tongue 28 extends and which has an aperture receiving a pin to which is attached one end of an operating arm 30, the opposite end of which is attached to a piston head located in a cylinder 32 which may be fluid actuated. The cylinder 32 will, of course, be rigidly attached to the conveyor frame or other fixed support. It will be understood by those skilled in this art that various actuators may be employed in this environment. Control of the cylinder 32 will be effected by actuation of the supply or bleed valves in the fluid lines connected to the cylinder 32 as is well understood in this technology. For example, the valves may be solenoid actuated by a current supplied by the output of a computer associated with the inspection station 12, the details of which are also well understood in this technology and which is commercially available from a number of sources in the market. Typically, the inspection station 12 will determine the curvature of portions of the cant 10 in relation to the speed of the conveyor 15 moving the cant along the path 14. The analysis by the computer in the inspection station 12 will be effective to impart a pivot motion to the chipping station 11 on the conveyor 15 so that the lengths of board formed by the gang saw will be the maximum possible for a cant having the detected curvature. This will increase the yield of the mill virtually independently of curvature of the logs provided to form the cants 10.

Figure 3:
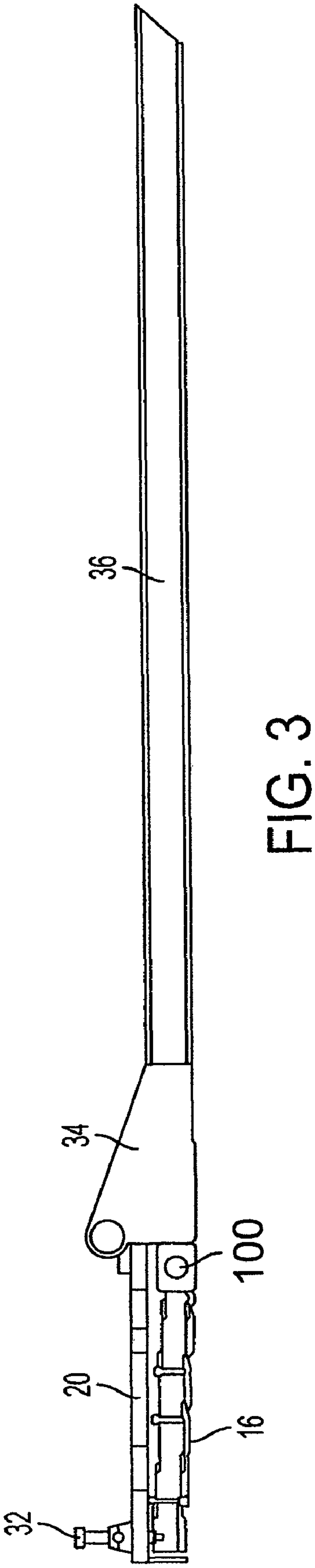
FIG. 3 is a top view of the guide arm of the present invention.

Referring to FIGS. 2 and 3, a yoke 34 is pivotably mounted to the side bar 20 by pivot pin 102 and yoke 34 is connected to the auxiliary guide arm 36 which extends in a direction opposite to the direction of guide arm 16. The guide arm 16 is pivotably mounted to the side bar 20 by the pivot pin 100. Preferably, the guide arm is made of hardened steel and may be L-shaped in cross-section as shown in FIG. 2 to ensure that it is more easily moved by the piston and cylinder arrangement shown without causing undue wear on the cylinder actuator. It will be understood that the arm 36 may also be independently actuated by a separate piston and cylinder arrangement controlled by the output of the inspection station 12. This will effectively extend the range of curved cants that can be handled with the apparatus of this invention.

It will be appreciated that the operation of the guide bar 16 for many curved cants will be set once by the inspection station readings for each cant depending on the detected curvature. It is contemplated that more than one adjustment of the guide bar 16 for an individual cant may be required such as where there is more than one curvature present in the cant. Also, continuous movement of the guide bar can be effected such as for severely irregular cants.

Having described the invention, it will be apparent to those skilled in this art that various modifications may be made thereto without departing from the spirit of the invention as defined in the appended claims.

What is claimed is:

1. A cant cutting apparatus comprising:
- an inspection station having a computer;
- a pivotable chipping station;
- a cutting device;
- a cant positioning device comprising a pivotable guide arm and an actuator for pivoting the pivotable guide arm, said cant positioning device being located upstream of said cutting device; and

- an in-feed conveyor for receiving a cant having a top, a bottom and opposing sides from a supply and passing the cant through said inspection station for determining the cant's curvature and through said pivotable chipping station for chipping the opposing sides of the cant to parallel faces and to said cant positioning device for adjusting an angle at which an end of said cant is positioned and fed relative to said cutting device and through said cutting device for cutting the cant into a plurality of boards, the conveyor being constructed to contact the bottom of the cant, said pivotable guide arm being pivotably mounted to a side bar on the conveyor to allow pivotal movement about a vertical pivot axis, said pivotable guide arm being constructed and arranged to contact one of the opposing sides of said cant to adjust the angle at which an end of said cant is positioned and fed relative to said cutting device, wherein said computer controls said actuator of said cant positioning device.

2. The apparatus as claimed in claim 1 wherein said inspection station includes means for determining any curvature of the cant along its length and passing that information to the actuator for the cant positioning device so that the leading end of the cant is positioned to enhance the cutting efficiency of the cutting device.

3. The apparatus as claimed in claim 1 wherein said in-feed conveyor passes through said inspection station carrying said cant during inspection of said cant.

4. The apparatus as claimed in claim 3 wherein the inspection station includes optical devices disposed along the path of the cant to measure any curvature of the cant along its length.

5. A cant cutting apparatus comprising:
- an inspection station constructed to determine a curvature of a cant passing through the inspection station;
- a pivotable chipping station;
- a rotatably mounted gang saw upstream of the chipping station;
- a cant positioning device immediately upstream of the gang saw, the cant positioning device comprising a pivotable guide arm, a press arm, and an actuator constructed to pivot the guide arm;
- a conveyor constructed for receiving a cant having a top, a bottom and opposing first and second sides from a supply and passing the cant through the inspection station for determining a curvature of the cant, through the chipping station for chipping the opposing sides of the cant, through the cant positioning device where an angle of the cant being fed into the gang saw is adjusted, and then to the gang saw where the cant is cut, the conveyor being constructed to contact the bottom of the cant, the guide arm is located on one side of the conveyor and the press arm is located on the other side of the conveyor opposite the guide arm, a first end of the guide arm is pivotably mounted to allow pivotable movement about a vertical pivot axis, and a second end of the guide arm being located closer to the gang saw than the first end, the guide arm being constructed and arranged to contact the first side of the cant and the press arm being constructed and arranged to contact the second side of the cant; and
- a computer connected to the inspection station and the cant positioning device, the computer is constructed such that when the curvature of a cant is detected, the press arm is activated to push against the second side of the cant and push the first side of the cant against the guide arm, if there is no curvature the guide arm is set to a home position, if a curvature is detected the computer determines a position of the cant to minimize the effect of the curvature at the point of contact with the gang saw, and the guide arm is pivoted by activating the actuator to move the cant to the position of the cant to minimize the effect of the curvature.

6. The cant cutting device according to claim 5, wherein said computer is constructed to calculate a required pivoting of said chipping station in order to maximize the obtainable amount of useful board lumber as the cant is fed through the gang saw.

7. The cant cutting device according to claim 5, wherein the gang saw is not pivotable.

8. The cant cutting device according to claim 5, further comprising an auxiliary guide arm located next to the first end of the guide arm, the guide arm and auxiliary guide arm extend in opposite directions, the auxiliary guide arm and guide arm being pivotably mounted to a side bar.

9. The cant cutting device according to claim 8, wherein the home position is when both the pivotable guide arm and pivotable auxiliary guide arm are parallel to a direction the conveyor travels.

10. A method of adjusting an angle of a cant using a cant cutting apparatus comprising:

an inspection station;

a computer;

a pivotable chipping station;

a cutting device;

an in-feed conveyor; and a cant positioning device comprising a pivotable guide arm and an actuator for pivoting the pivotable guide arm, said pivotable guide arm being pivotably mounted to a side bar on the conveyor to allow pivotal movement about a vertical pivot axis said cant positioning device being located upstream of said cutting device, the method comprising:

receiving a cant having a top, a bottom and opposing first and second sides from a supply and passing the cant through said inspection station on the conveyor for determining the cant's curvature, the bottom of the cant contacting the conveyor;

passing the cant through said pivotable chipping station and chipping the opposing sides of the cant to parallel faces;

passing the cant to the positioning device and adjusting an angle at which an end of said cant is positioned and fed relative to said cutting device by contacting one of the first and second opposing sides of the cant with the pivotable arm; and passing the cant through the cutting device and positioning the cant into a plurality of boards, wherein the computer controls said actuator of said cant positioning device.

11. The method according to claim 10, wherein the guide arm is constructed and arranged to contact the first opposing side of the cant and the cant positioning device further comprising a press arm located on a side of the conveyor opposite the guide arm, the press arm being constructed and arranged to contact the second opposing side of the cant, the method further comprising activating the press arm to push against the second side of the cant and press the first side of the cant against the guide arm.

12. The method of claim 10, wherein said computer calculates a required pivoting of said chipping station in order to maximize the obtainable amount of useful board lumber as the cant is fed through the gang saw.

13. The method according to claim 10, wherein the gang saw is not pivotable.

14. The method according to claim 10, further comprising an auxiliary guide arm located next to the first end of the guide arm, the guide arm and auxiliary guide arm extend in opposite directions, the auxiliary guide arm and guide arm being pivotably mounted to a side bar, the method further comprising contacting a side of the auxiliary guide arm against one of the opposing sides of the cant.

* * * * *